United States Patent
Hsu et al.

(10) Patent No.: US 8,265,010 B2
(45) Date of Patent: Sep. 11, 2012

(54) WIRELESS COMMUNICATION SYSTEM AND ROUTING METHOD FOR PACKET SWITCHING SERVICE, FEMTO AP USING THE ROUTING METHOD

(75) Inventors: Yu-Ching Hsu, Hsinchu County (TW); Chai-Hien Gan, Hsinchu (TW); Hsin-Yu Liao, Hsinchu (TW); Ching-Feng Liang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 301 days.

(21) Appl. No.: 12/722,536

(22) Filed: Mar. 12, 2010

(65) Prior Publication Data

US 2011/0103303 A1    May 5, 2011

(30) Foreign Application Priority Data

Nov. 2, 2009  (TW) ............................. 98137151 A

(51) Int. Cl.
*H04W 4/00* (2009.01)
(52) U.S. Cl. ........................................ 370/328
(58) Field of Classification Search ................ 370/203, 370/204–215, 229–240, 241–253, 310–337, 370/338–350, 395.1, 395.3, 395.4, 395.41, 370/395.42, 395.5, 395.52, 395.53, 412–421, 370/431–457, 458–463, 464–497, 498–529
See application file for complete search history.

(56) References Cited

U.S. PATENT DOCUMENTS

| | | | | |
|---|---|---|---|---|
| 8,064,909 B2* | 11/2011 | Spinelli et al. | ................ | 455/436 |
| 2009/0129342 A1* | 5/2009 | Hwang et al. | ................ | 370/331 |
| 2009/0156213 A1* | 6/2009 | Spinelli et al. | ................ | 455/436 |
| 2009/0279522 A1* | 11/2009 | Leroy et al. | ................... | 370/338 |
| 2009/0286510 A1* | 11/2009 | Huber et al. | .................. | 455/410 |
| 2009/0299788 A1* | 12/2009 | Huber et al. | ...................... | 705/7 |
| 2009/0318124 A1* | 12/2009 | Haughn | ......................... | 455/418 |
| 2010/0002663 A1* | 1/2010 | Shinozaki | ..................... | 370/338 |

(Continued)

FOREIGN PATENT DOCUMENTS

JP    2006067324    3/2006

(Continued)

OTHER PUBLICATIONS

"Office Action of Japan Counterpart Application", issued on Apr. 17, 2012, p. 1-p. 3, in which the listed references were cited.

*Primary Examiner* — Kwang B Yao
*Assistant Examiner* — Jung-Jen Liu
(74) *Attorney, Agent, or Firm* — Jianq Chyun IP Office

(57) ABSTRACT

A wireless communication system, a routing method for a packet switched service, and a Femto AP (FAP) using the routing method are provided. The wireless communication system may include a core network, a broadband IP network, a FAP and at least a user equipment (UE). The UE connects the core network through the FAP and the broadband IP network. The routing method is as follows. The FAP may evaluate a request of the packet switched service sent by the UE, and may reply an accept message to the UE. The accept message may include a FAP address. The UE may use the FAP address to send a packet switching data to the FAP in order to obtain the packet switched service. The FAP may directly conduct the packet switched service with a packet switched service supply end through the broadband IP network without routing through the core network.

19 Claims, 8 Drawing Sheets

U.S. PATENT DOCUMENTS

| | | | |
|---|---|---|---|
| 2010/0027521 A1* | 2/2010 | Huber et al. | 370/338 |
| 2010/0074187 A1* | 3/2010 | Sun et al. | 370/329 |
| 2010/0128694 A1* | 5/2010 | Choi-Grogan | 370/331 |
| 2010/0128697 A1* | 5/2010 | Choi-Grogan | 370/332 |
| 2010/0130171 A1* | 5/2010 | Palanigounder et al. | 455/411 |
| 2010/0165960 A1* | 7/2010 | Richardson | 370/338 |
| 2010/0254334 A1* | 10/2010 | Lin et al. | 370/329 |
| 2010/0272021 A1* | 10/2010 | Kopplin et al. | 370/328 |
| 2011/0075557 A1* | 3/2011 | Chowdhury et al. | 370/230 |
| 2011/0170517 A1* | 7/2011 | Bakker et al. | 370/331 |
| 2011/0171953 A1* | 7/2011 | Faccin et al. | 455/426.1 |
| 2011/0306332 A1* | 12/2011 | Macpherson | 455/419 |
| 2012/0044908 A1* | 2/2012 | Spinelli et al. | 370/331 |

FOREIGN PATENT DOCUMENTS

| | | |
|---|---|---|
| JP | 2009528718 | 8/2009 |
| JP | 2009253431 | 10/2009 |
| JP | 2011519537 | 7/2011 |
| WO | 2009132139 | 10/2009 |

* cited by examiner

WIRELESS COMMUNICATION SYSTEM AND ROUTING METHOD FOR PACKET SWITCHING SERVICE, FEMTO AP USING THE ROUTING METHOD

CROSS-REFERENCE TO RELATED APPLICATION

This application claims the priority benefit of Taiwan application serial no. 98137151, filed on Nov. 2, 2009. The entirety of the above-mentioned patent application is hereby incorporated by reference herein and made a part of specification.

BACKGROUND OF THE INVENTION

1. Technical Field

The disclosure relates to a wireless communication system and routing method for a packet switched service, femto AP using the routing method.

2. Background

According to research data of various studies, a proportion that users use mobile phones at home is rapidly growing, and considering the other indoor commercial usage environments such as offices, nearly 60-70% mobile communications are occurred indoors according to NTT DoCoMo's statistics. In the future, in case that a bandwidth requirement of digital contents is greatly increased, and a difficulty for constructing an outdoor base station is increased due to environmental protection protests, indoor communication capacities can be seriously insufficient. Therefore, a Femto Access Point (AP) having low power and high frequency bandwidth could be a good solution. The Femto AP allows a user to connect to a mobile core network for accessing telecom services under an indoor environment.

The Femto AP is a small and low power cellular base station, which is mainly used in indoor places such as at house and at offices, etc., so that it is also referred to as a home node B (HNB). The Femto AP serves as a compensation of indoor coverage of a cellular network, and provides the user with voice and data services. A profile of the Femto AP is generally similar to a wireless fidelity (Wi-Fi) AP, which can be independently used, and can also be integrated in a home gateway to serve as a part of a home network.

FIG. 1 is a schematic diagram illustrating a Femto AP network structure. A user indoor can use a user equipment (UE) to connect the Femto AP through a standard mobile communication access protocol. Such standard mobile communication access protocol is, for example, a wideband code division multiple access (WCDMA) protocol or a high speed download packet access (HSDPA) protocol, etc., which is determined according to an applied communication system. Moreover, other Femto APs (for example, a Femto AP 122) can be configured at other areas.

A UE 110 is connected to the Femto AP 120, and the Femto AP 120 transmits messages or data packets between the UE 110 and a Femto gateway (GW) 140 through a broadband IP network 130 according to an Internet protocol (IP). The Femto GW 140 transmits the IP messages or the data packets between the Femto AP 120 and a mobile core network 150.

A communication path between a user of a wireless communication device 111 of the Femto AP 120 and a user of a wireless communication device 113 is established sequentially through the Femto AP 120, the broadband IP network 130, the Femto GW 140, a mobile switching center (MSC) of the mobile core network 150, and outdoor base station.

In a present Femtocell network structure, when the UE is about to use a packet switched (PS) service, for example browsing a website, a session has to be established between the UE and the mobile core network 150. In an example, under universal mobile telecommunication system (UMTS) architecture, data of such session is recorded in a packet data protocol (PDP) context, which includes an IP address assigned to the UE, a session quality of service (QoS), and a routing information, etc., and are respectively stored in the UE and nodes of the mobile core network 150, for example, a serving GPRS support node (SGSN) and a gateway GPRS support node (GGSN) (for example, a SGSN 152 and a GGSN 154 shown in FIG. 1), where the GPRS is the so-called general packet radio service.

The SGSN 152 is to transfer wireless data of the user to the GPRS network. Moreover, data transmitted to the GGSN 154 from an external network is transmitted to the SGSN 152, and is then transferred to a wireless network interface for the user. The GGSN 154 is used for transferring packets of an internal network of a system service provider to the external network, and transferring packets of the external network to the internal network of the system service provider. For example, the GGSN 154 switches packet data with an Internet service provider (ISP) (for example, a Google server 162 or a Yahoo server 164) in the Internet 160. Since connection approaches of the two terminals are probably different, the GGSN node 154 has to perform operations of data cutting, packet conversion, and so on.

The UE 110 and the Femto AP 120 are used to describe a flow of obtaining the service provided by the ISP with reference of FIG. 2.

When the mobile core network 150 allows the UE 110 to establish the PDP context, the session QoS between the UE 110 and the Femto AP 120 and between the Femto AP 120 to the mobile core network 150 are set by a radio access bearer setup procedure. After the radio access bearer setup procedure is completed, an activate PDP context accept message is transmitted back to the UE 110, which means that the procedure of establishing the PDP context is finished. Now, the UE 110 obtains an IP address assigned by the mobile core network 150. After the UE 110 obtains the IP address, the UE 110 can access the PS service (for example, the service provided by the Google server 162) according to the IP address. During a data transmission, a transmission path thereof is shown in FIG. 1, which is routed through the UE 110, the Femto AP 120, the broadband IP network 130, the Femto GW 140 in the mobile core network 150, the SGSN 152, the GGSN 154, and the Google server 162. According to the system of FIG. 1, if the UE 110 is going to access data of the Google server 162, a path thereof has to be from (a), (b), (c), (d), (i), (j) to (f).

According to the above descriptions, it is known that transmission of the packets of all of the Internet services 160 has to be routed through the mobile core network 150, and when a data amount is greatly increased, a burden of the mobile core network 150 is greatly increased, and extra equipments have to be added to carry on these services.

SUMMARY

A wireless communication system is introduced herein. The wireless communication system may include a mobile core network, a broadband IP network, a Femto AP (FAP) and a user equipment (UE). The UE may connect to the FAP through a wireless approach, so as to connect the broadband IP network through the FAP, and may establish a connection channel with the mobile core network to obtain one or a plurality of services. When the UE sends a request message to obtain a packet switched service, the FAP evaluates the request message and replies an accept message to the UE. The accept message may include a setting address provided by the FAP. The UE sends packet switching data to the FAP according to the setting address in order to obtain the packet switched service. The FAP may directly conduct the packet switched service with a packet switched service supply end through the broadband IP network.

A routing method for a packet switched service, which is suitable for a wireless communication system, is introduced herein. The wireless communication system may include a mobile core network, a broadband IP network, a Femto AP (FAP) and a user equipment (UE). The UE is connected to the mobile core network through the FAP and the broadband IP network. The routing method for the packet switched service is as follows. When the UE sends a request message to obtain the packet switched service, the FAP may evaluate the request message and reply an accept message to the UE. The accept message may include a setting address provided by the FAP. The UE may send a packet switching to the FAP according to the setting address in order to obtain the packet switched service. The FAP may directly conduct the packet switched service with a packet switched service supply end through the broadband IP network.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
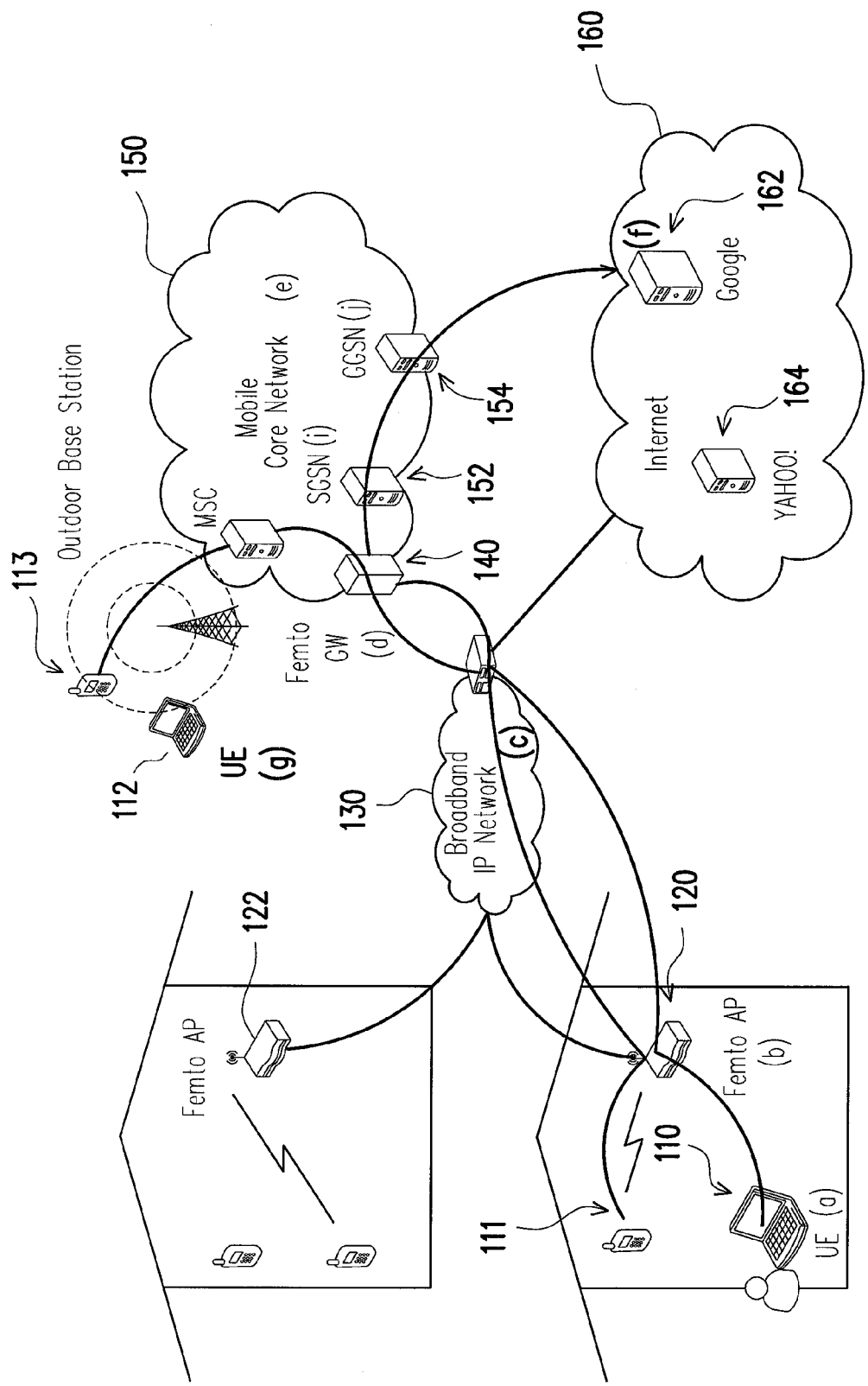
FIG. 1 is a schematic diagram illustrating Femto AP network architecture.

An embodiment provides a session management mechanism designed in allusion to a Femto AP (FAP), which may reduce a burden of a mobile core network, and remove a part of routing path of a packet switched service from the mobile core network. According to such mechanism, besides the burden of the mobile core network may be reduced, a delay time for transmitting packets may also be reduced.

An exemplary embodiment provides a routing method for a packet switched service, which is suitable for a wireless communication system. The wireless communication system, in an exemplary case, may include a mobile core network, a broadband IP network, a FAP and a user equipment (UE). The UE is connected to the mobile core network through the FAP and the broadband IP network. The routing method for the packet switched service is as follows. When the UE sends a request message to obtain the packet switched service, the FAP may evaluate the request message and reply an accept message to the UE. The accept message may include a setting address provided by the FAP. The UE may use the setting address to send packet switching data to the FAP in order to obtain the packet switched service. The FAP may directly conduct the packet switched service through the broadband IP network with a packet switched service supply end without routing through the mobile core network.

To facilitate describing the embodiment, when the UE sends the request message to obtain the packet switched service, a standard PDP context activation procedure may be used for description, which may include related descriptions of parameters included in an activate PDP context request message and an activate PDP context accept message. However, it is not limited thereto, for example, the PDP context activation procedure is a universal mobile telecommunication system (UMTS) network procedure, and the same concept can also be applied to different mobile network communication systems, for example, a system architecture evolution (SAE) system or a code division multiple access 2000 (CDMA2000), etc. Though, in the other systems (for example, the SAE system), the PDP context is referred to as an EPS bearer in the SAE system.

The activate PDP context request message may include all or part of parameters of NSAPI, TI, PDP type, PDP address, QoS requested, access point name (APN), protocol configuration options, and request type, etc. These parameters are described as follows:

NSAPI: a network service access point identifier, which is configured by the UE. The NSAPI is used for identifying a PDP service access point (SAP) at the UE, and a pair of NSAPI/IMSI is used for identifying a tunnel endpoint identifier (TEID) at the mobile core network, wherein the IMSI is referred to as an international mobile subscriber identifier. The NSAPI is used for identifying a radio access bearer context at the Femto AP, and a radio bearer between the UE and the Femto AP can be found according to the context. The UE has to confirm that such value is not repeatedly used.

TI: a transaction ID.

PDP type: a type of the IP address required by the UE, for example, IPv4 and IPv6, etc.

PDP address: if the UE lefts this column blank, it represents that the network end is required to dynamically configure an IP address. Conversely, the filled IP address is a static IP address required by the UE.

QoS requested: a session QoS required by the UE.

Access Point Name (APN): (optional) an external network name of the service and the session to be used by the UE, for example, Internet, etc., which is an optional column content.

Protocol Configuration Options: (selective) a communication protocol configuration option. The UE may transmit or request related information of the supported external network to a gateway GPRS support node (GGSN) according to this parameter, for example, a P-CSCF address of an IMS system, and a situation that the UE supports a network request bearer control mode (BCM).

Request type: (selective) which is used for representing whether the UE is changed from a non-3GPP network (for example, a WLAN) to a 3GPP network, and such parameter may be interpreted by a serving GPRS support node (SGSN), wherein 3GPP is a referred as a third generation partnership project.

The activate PDP context accept message may include all or part of the parameters of TI, PDP type, PDP address, QoS negotiated, radio priority, packet flow Id, protocol configuration options, etc., and these parameters are described as follows:

TI: a transaction ID, which is the same to the TI in the corresponding activate PDP context request message.

PDP type: a type of the configured IP address.

PDP address: (optional) a configured dynamic IP address.

QoS negotiated: a session QoS that is actually configured through the radio access bearer setup procedure.

Radio priority: if the UE supports an A/Gb mode, the SGSN determines the radio priority assigned to the lower layers during a data uploading of the UE according to a content of the QoS negotiated.

Packet flow Id: (selective) a packet flow identifier assigned to the current session by the SGSN according to the content of the QoS negotiated, and the possible values thereof are best effort, signaling, short message service (SMS) or tunneling of messages 8 (TOMB), etc.

Protocol configuration options: (selective) the GGSN reply the external network related information required by the UE and the BCM message to the UE according to the protocol configuration operations, which represents whether the network end is allowed to actively request the UE to establish a secondary PDP context.

Figure 2:
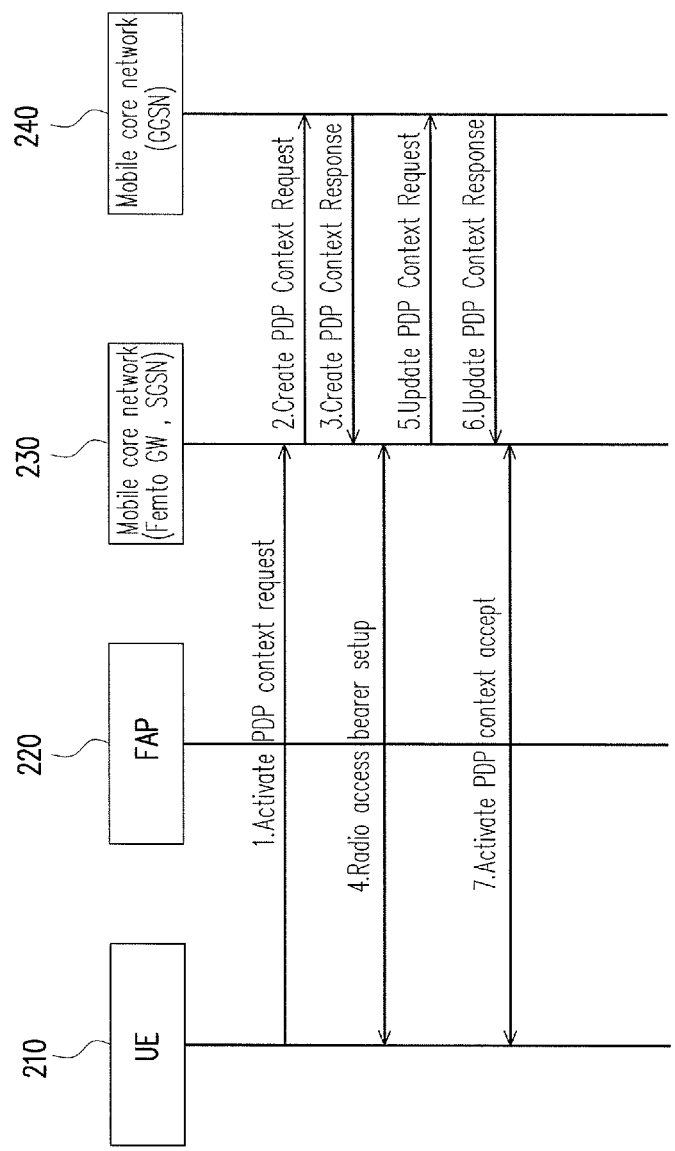
FIG. 2 is a schematic diagram illustrating a signal transmission flow of a standard activate PDP context request message and an activate PDP context accept message.

Referring to FIG. 2, FIG. 2 is a schematic diagram illustrating a signal transmission flow of the standard activate PDP context request message and the activate PDP context accept message, and system architecture thereof is as that shown in FIG. 1. Such network architecture may be described according to four nodes of a UE 210, a Femto AP (FAP) 220, a Femto GW and a SGSN 230 of the mobile core network, and a GGSN 240, in an exemplary embodiment.

Under a Femtocell network structure, when the UE 210 is going to use a packet switched (PS) service, for example, to browse a website, the UE 210 may send the activate PDP context request message, and then the activate PDP context request message may be transmitted to the SGSN 230 of the mobile core network through the FAP 220, as that shown in step 1. Since the GGSN 240 is in charge of switching the packets between an internal network of a system service provider and the external network, the SGSN 230 may transmit a create PDP context request message to the GGSN 240 to create the PDP context, as that shown in step 2. Then, the GGSN 240 may transmit back a create PDP context response message, as that shown in step 3.

Thereafter, a radio access bearer setup procedure may be performed between the UE 210, the FAP 220 and the SGSN 230 to establish, for example, the session QoS, as that shown in step 4. Then, the SGSN 230 may transmit an update PDP context request message to the GGSN 240 to update the PDP context as that shown in step 5. Thereafter, the GGSN 240 may transmit back an update PDP context response message as that shown in step 6. Then, the SGSN 230 may transmit back an activate PDP context accept message to the UE 210 through the FAP 220, so as to establish the session of the PS service.

Regarding the whole establishment process, it is necessary to rout the data through and between the UE, the FAP, the broadband IP network, the Femto GW and the SGSN in the mobile core network, and the GGSN.

In an exemplary embodiment, a session management mechanism of a PS service may be designed in allusion to the FAP, so that when the UE is going to access the Internet services, a burden of the mobile core network may be reduced, and a delay time for transmitting packets may also be reduced. In the exemplary embodiment, when the UE is going to access the Internet services, a routing path thereof may be reduced to be routed through the UE, the FAP and the broadband IP network, so as to directly establish the session with the Internet.

In an exemplary embodiment, a mechanism of establishing a session management function module in the FAP is introduced. In the exemplary embodiment, when the UE is about to establish a session with the mobile core network, the FAP may be used to substitute a part of the functions of the mobile core network, and the PDP context may be established on the FAP.

Figure 3:
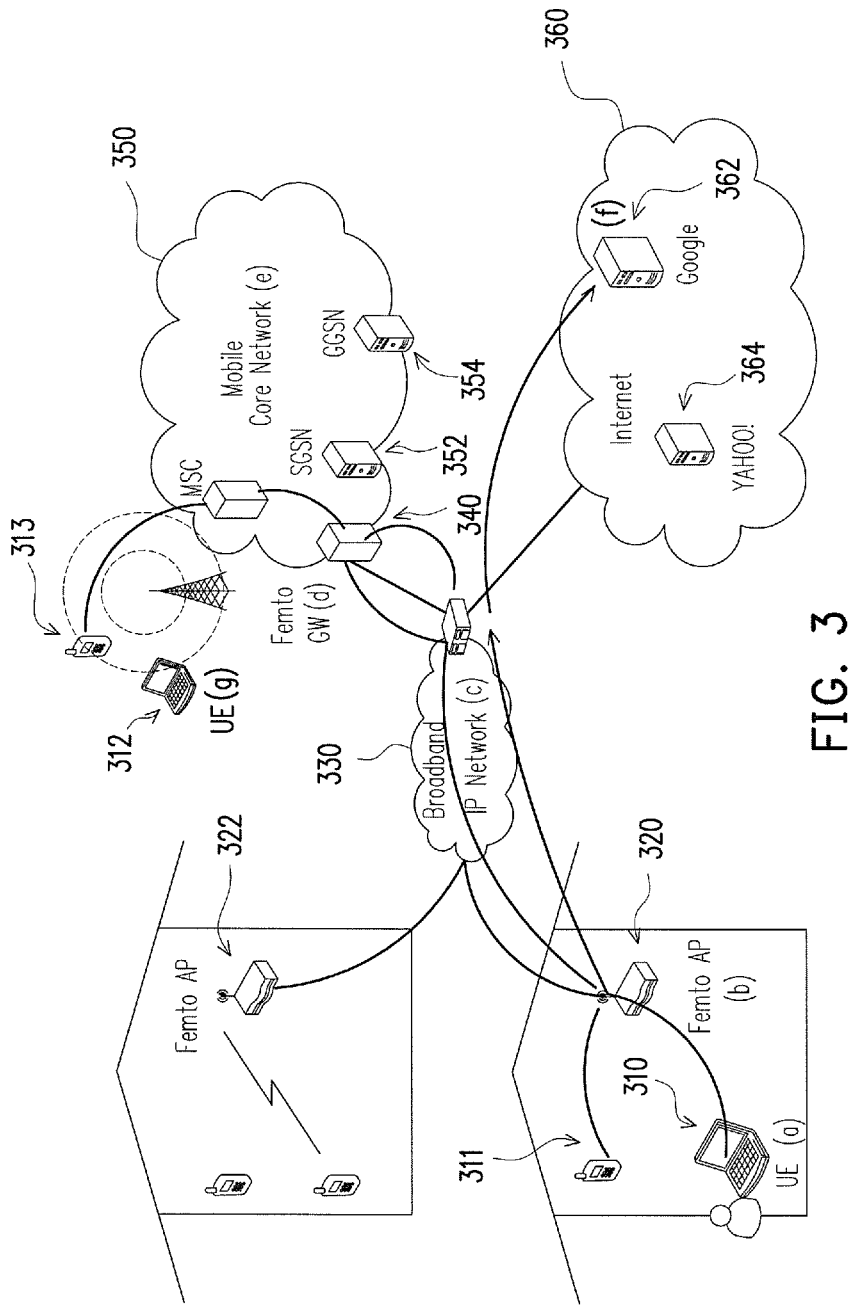
FIG. 3 is a schematic diagram illustrating a network structure of establishing a session management function module mechanism in a Femto AP according to an exemplary embodiment.

Referring to FIG. 3, which is a schematic diagram illustrating network architecture of establishing a session management function module mechanism in a FAP according to an exemplary embodiment.

FIG. 3 is a schematic diagram illustrating a FAP network structure according to an exemplary embodiment. In the network structure, two FAPs 320 and 322 may be used for description, however, it is not limited thereto. A UE 310 may connect to the FAP 320. The FAP 320 may transmit messages or data packets of the UE 310 to a Femto GW 340 through a broadband IP network 330 according to an Internet protocol (IP).

A protocol stack from the Femto GW 340 to the FAP 320 and a protocol stack from the Femto GW 340 to the mobile core network 350 are basically the same, both of which may be mobile network protocol (Iu-CS/Iu-PS). At least one difference between the left and right protocol stacks of the Femto GW 340 may be that a HNBAP protocol is added between the Femto GW 340 and the Femto AP 320. Since the Femto GW 340 and the Femto AP 320 may be connected through the broadband IP network 330, the Iu-CS/Iu-PS is stacked through the IP protocol. However, between the Femto GW 340 and the mobile core network 350 the Iu-CS/Iu-PS is probably stacked through a network of ATM (or E1/T1, SDH/SONET, etc.).

Moreover, a communication path between a user of a wireless communication device 311 of the FAP 320 and a user of a wireless communication device 313 of an outdoor base station may be established sequentially through the FAP 320, the broadband IP network 330, the Femto GW 340, and a mobile switching center (MSC) of the mobile core network 350. If the wireless communication device 313 of the outdoor base station is not connected to the user of the FAP 320, it is directly connected to the mobile core network 350 without connecting the Femto GW 340. Moreover, the FAP 320 may also be connected to another FAP 322 through the broadband IP network 330.

Under the Femtocell network structure provided by the exemplary embodiment, when the UE 310 is about to use a packet switched (PS) service, the FAP 320 may be used to substitute at least a part of the functions of the mobile core network 350 to establish the PDP context on the FAP 320. In an embodiment, when the UE 310 is about to obtain an Internet service, the routing path thereof may be reduced to be routed through the UE 310, the FAP 320 and the broadband IP network 330 by modifying an IP address and routing information, etc., so as to directly establish the session with the Internet. According to the system structure of FIG. 3, if the UE 310 is about to access data of the Google server 362, a routing path thereof may be directly established from (a), (b), (c), (d) to (f).

In an exemplary embodiment, after the FAP 320 establishes the PDP context, the IP address of the UE 310 may be assigned, and such IP address may be assigned according to a dynamic host configuration protocol (DHCP) of a local area network (LAN) where the FAP 320 is located, or the FAP 320 may perform an IP address translation, for example, a network address translation (NAT), by which the related column in an IP header is modified, and then the routing is performed. When the UE 310 uses the PS service, the routing path thereof may be changed from a path routing through the mobile core network to a path without routing through the mobile core network.

Figure 4:
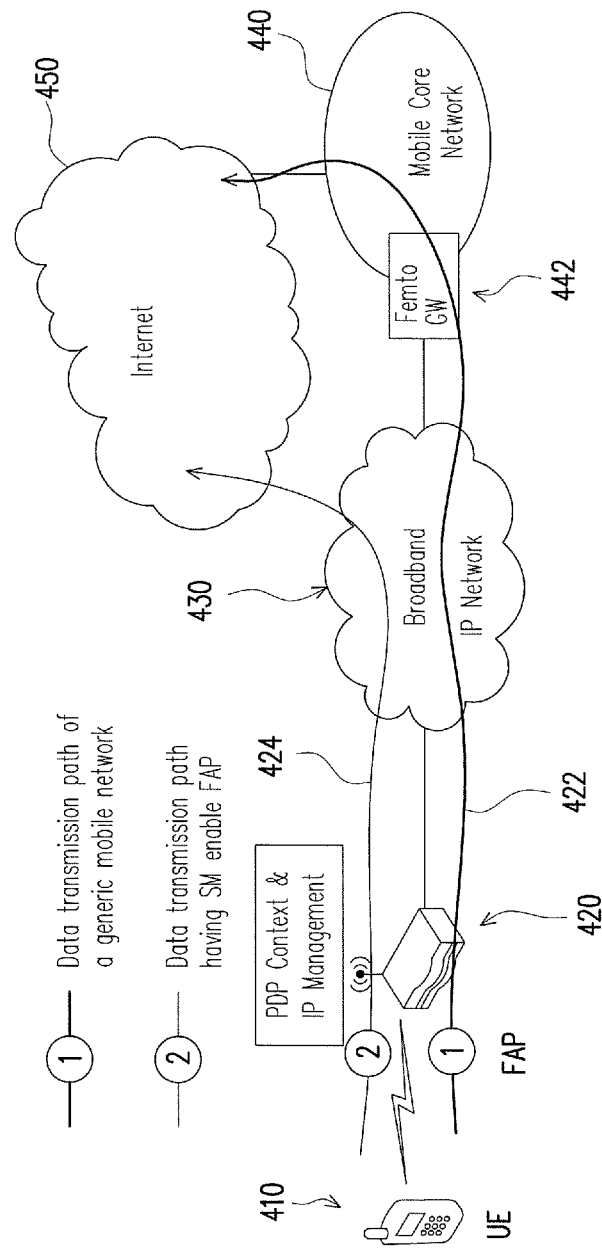
FIG. 4 is a schematic diagram illustrating a system structure of establishing a session management function module mechanism in a Femto AP according to an exemplary embodiment.

The PDP context may optionally exist on the two nodes of the UE 310 and the FAP 320. The UE 310 establishes the PDP context without a participation of the mobile core network 350, i.e. the FAP 320 serves as the mobile core network 350 to assist the UE 310 in establishing the PDP context. Referring to FIG. 4, which is a schematic diagram illustrating a system structure of establishing a session management function module mechanism in a FAP according to an exemplary embodiment. The system structure may include a UE 410, a FAP 420, a broadband IP network 430, a mobile core network 440 and the Internet 450. The mobile core network 440 may include a Femto GW 442, a SGSN and a GGSN.

In FIG. 4, two different data transmission paths are illustrated. A first path may be a data transmission path 422 of a generic mobile network, which is started from the UE 410, and reaches the Internet 450 sequentially through the FAP 420, the broadband IP network 430 and the mobile core network 440. The data transmission path 422 is a standard PS data transmission path. Regarding the session management function module mechanism established in the FAP 420 and the service to be used by the UE 410, a second path may be a data transmission path 424 without routing through the mobile core network 440. The data transmission path 424 may be started form the UE 410, and may be directly connected to the Internet 450 through the FAP 420 and the broadband IP network 430.

Regarding the session management mechanism designed in allusion to the FAP 420, the service to be accessed by the UE 410 is transmitted without routing through the mobile core network 440, and a part of the routing path of the packet switched service is removed from the mobile core network 440, so that a burden of the mobile core network 440 may be reduced. Moreover, the delay time for transmitting the packet may also be reduced. Certainly, if it is discovered that the service to be used by the UE 410 has to be routed through the mobile core network 440, the message may be still transmitted to the mobile core network 440 according to a standard process.

Implementations of an exemplary embodiment are described with reference of FIG. 5 or FIG. 6.

Figure 5:
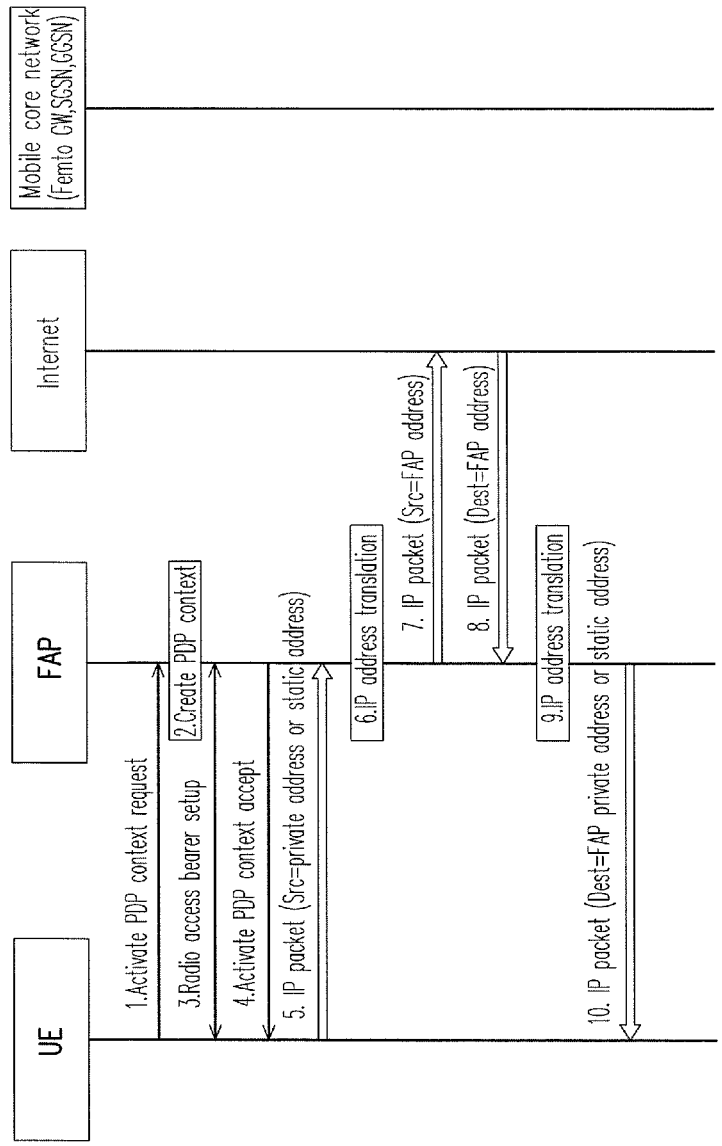
FIG. 5 is flowchart of establishing a session management function module mechanism in a Femto AP according to an exemplary, embodiment.

Referring to FIG. 5, FIG. 5 is flowchart of establishing the session management function module mechanism in the FAP according to an exemplary embodiment. A flow of establishing the PDP context on the two nodes of the UE and the FAP may include signal transmission flows of the activate PDP context request message and the activate PDP context accept message. Such network structure may be described according to four nodes of the UE, the FAP, the Internet, and the mobile core network (including the Femto GW, the SGSN and the GGSN), in an exemplary example.

In step 1, the UE sends an activate PDP context request message. The FAP receives the message and evaluates a content of the message. If a value of the parameter APN is a specific value, for example, Internet, it represents that the service to be accessed by the UE can be transmitted without routing through the mobile core network. Therefore, the FAP may not transmit the message to the mobile core network, and may establish a radio bearer procedure according to its own network state and the current session QoS, for example, a part of bearer in a standard radio access bearer setup procedure (for example, creation of PDP context of step 2, and the radio bearer procedure of step 3).

In step 4, the FAP may generate and transmit an activate PDP context accept message to the UE. Then, after the UE receives the activate PDP context accept message, the UE receives and sends data according to the IP address assigned by the FAP.

In the exemplary embodiment, the IP address obtained by the UE may be a private IP address assigned by the FAP or may be a static address required by the UE, so that when the data packet is transmitted through the FAP, the FAP may perform the IP address translation, namely, the FAP may take a responsibility of the network address translation (NAT) to perform the translation. Therefore, the packet may be directly routed to the Internet without routing through the mobile core network. In step 5, the UE transmits the IP packet (a source address may be set as the private address or the static address, i.e. Src=private address/static address) according to the obtained address. Then, in step 6, the FAP may perform the IP address translation, and may set the source address to be the FAP address, i.e. Src=FAP address, and transmit the IP packet to the Internet.

Regarding the IP packet replied by the Internet, a destination address thereof may be the FAP address, i.e. Dest=FAP address. Then, after the FAP performs the IP address translation, the destination address of the replied IP packet may be translated to a private address or a static address assigned to the UE, i.e. Dest=private address/static address.

Regarding the session management mechanism designed in allusion to the FAP, the service to be used by the UE may be transmitted without routing through the mobile core network, and a part of the routing path of the packet switched service may be removed from the mobile core network, so that a burden of the mobile core network is reduced. According to such mechanism, besides the burden of the mobile core network may be reduced, the delay time for transmitting the packet may also be reduced. Certainly, if it is discovered that the service to be accessed by the UE has to be routed through the mobile core network, the message may be still transmitted to the mobile core network according to the standard process.

In the above step 4, in a content of the activate PDP context accept message that may be generated by the FAP and transmitted to the UE, a plurality of parameters may be changed to be different to the standard parameters, which are described as follows:

TI: a transaction ID, which is the same to the TI in the corresponding activate PDP context request message.

PDP type: a type of the configured IP address.

PDP address: an IP address configured to the UE. The FAP can execute a dynamic host configuration protocol (DHCP) client to request a private IP address from the rear-end broadband IP network; or if the IP address of the FAP is already configured by the broadband IP network in advance, the FAP can configure a private IP address to the UE; or if the UE request a static address, such value can be the same to the PDP address in the corresponding activate PDP context request message.

QoS negotiated: a QoS actually configured to the current session according to the radio access bearer setup procedure.

Radio priority: which may be left blank. Such value is used by a base station system (BSS) to determine a radio access precedence, i.e. an access priority and a service precedence.

Packet flow Id: which may be left blank, or a corresponding value obtained according to the QoS negotiated, for example, best effort, signaling, SMS or TOMB, etc.

Protocol configuration options: which may be left blank, so that the UE does not accept a session request sent by the network end.

Figure 6:
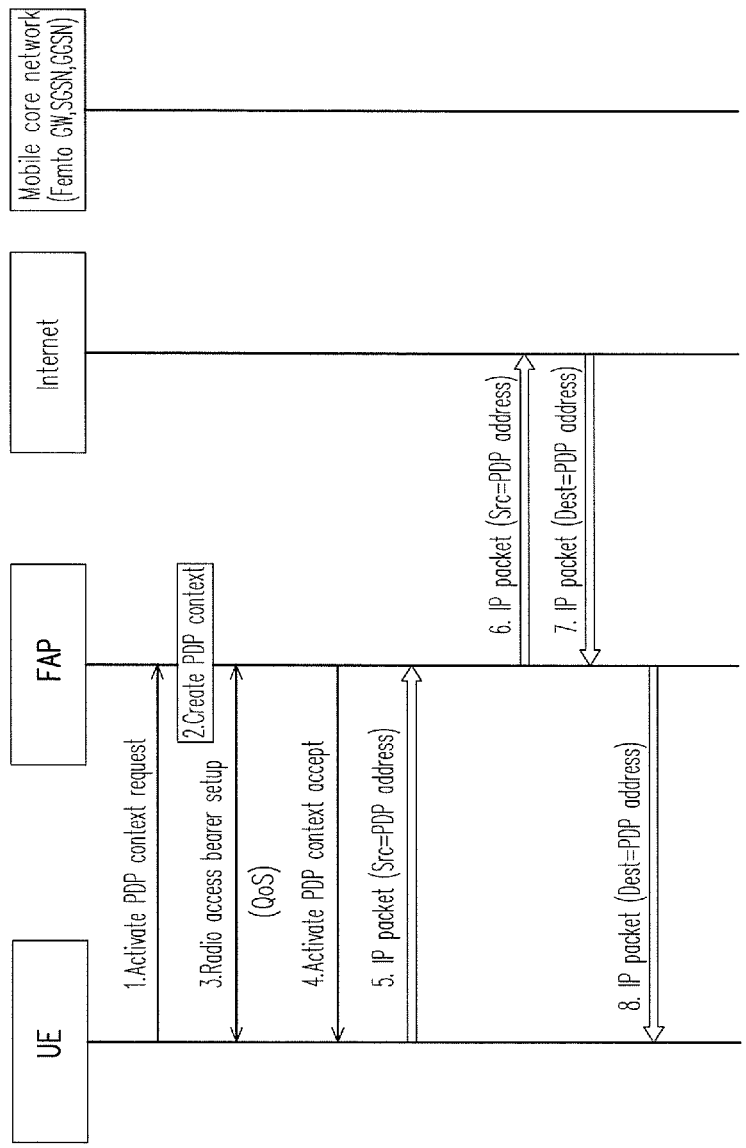
FIG. 6 is flowchart of establishing a session management function module mechanism in a Femto AP according to an exemplary embodiment.

An exemplary embodiment is provided with reference of FIG. 6. In FIG. 6, steps 1-3 are similar to that in FIG. 5, though a difference there between may at least include that the PDP address may be a public IP address that may be routed on the network, i.e. a non-private address. In the exemplary embodiment, the FAP may obtain the IP address for the UE according to the DHCP, in an exemplary example, and then fills it in the activate PDP context accept message. In another embodiment, the broadband IP network may assign a plurality of IP addresses to the FAP in advance, and the FAP may manage the IP address pool by itself.

FAP may serve as a router, and assign the managed IP address to the UE. When the data packet of the UE may be routed to the FAP, the FAP may not necessarily perform special processing to the data packet, but may directly rout the data packet to the Internet without passing through the mobile core network.

In the exemplary embodiment, the PDP address may be an IP address of the broadband IP network domain, so that according to an IP routing mechanism, the mobile core network is not routed. Therefore, the data packet may be directly routed to the Internet. In step 5, the UE transmits an IP packet (a source address is set as the PDP address, i.e. Src=PDP address) according to an obtained address. Then, in step 6, the IP packet may be directly routed to the Internet. Regarding an IP packet replied by the Internet, its destination address may be the PDP address, i.e. Dest=PDP address. Then, IP packet may be directly routed back to the UE through the FAP.

Regarding the session management mechanism designed in allusion to the FAP, the service to be used by the UE is transmitted without routing through the mobile core network, and a part of the routing path of the packet switched service is removed from the mobile core network, so that a burden of the mobile core network may be reduced.

Figure 7:
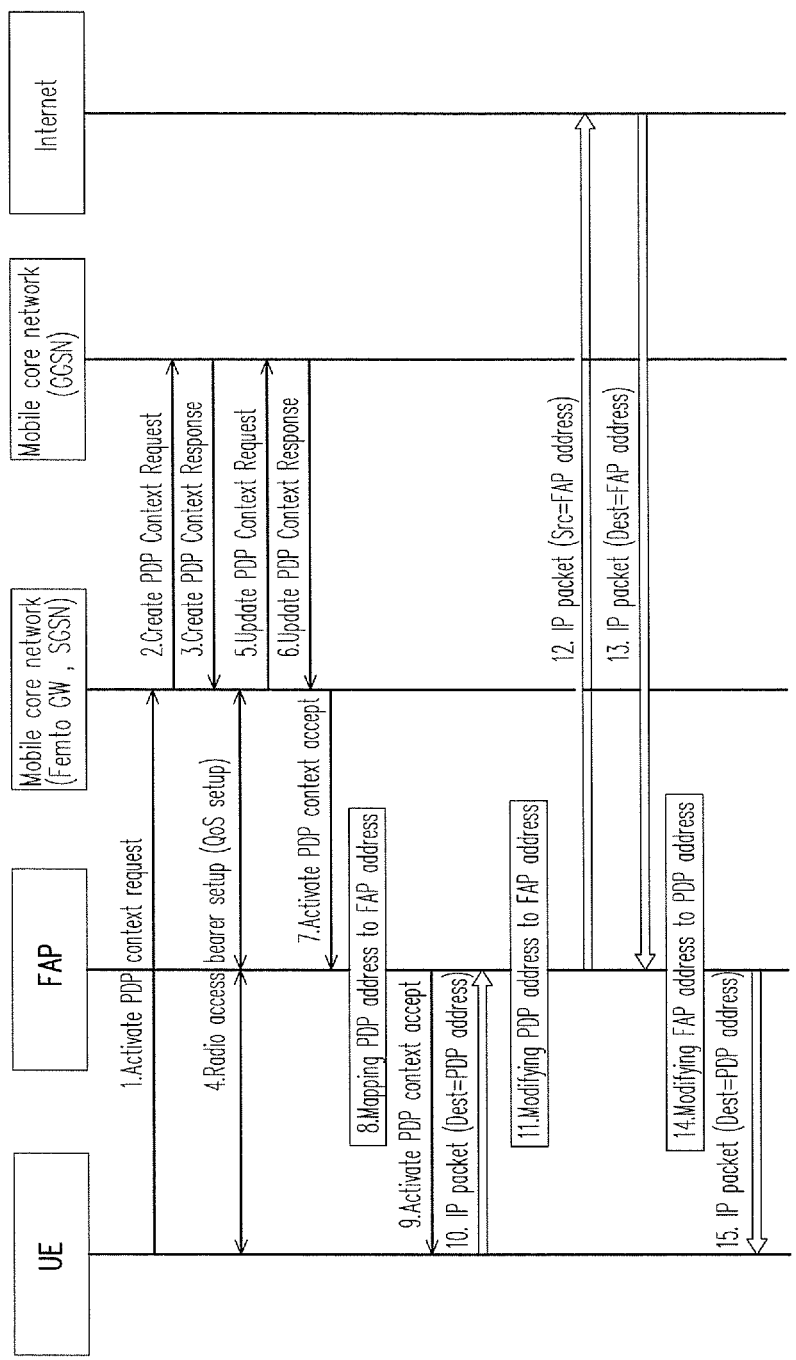
FIG. 7 is flowchart of establishing a session management function module mechanism in a Femto AP according to an exemplary embodiment.

An exemplary embodiment is provided with reference of FIG. 7. Such network structure may be described according to five nodes of the UE, the FAP, the Femto GW and the SGSN of the mobile core network, the GGSN and the Internet, but it is not limited thereto. In the exemplary embodiment, the PDP context may be respectively established on the UE and the mobile core network (including the SGSN and the GGSN), when the UE and the mobile core network establish the PDP context, the FAP may extract and record information of the PDP context. When the UE transmits a data packet, the FAP may modify the IP header of the UE, so that the data packet may be transmitted without routing through the mobile core network, i.e. when the data packet of the UE is received, the FAP may take a part of responsibility of the network address translation (NAT).

A detailed implementation method is shown in FIG. 7.

In the method of the exemplary embodiment, steps. 1-6 may be the same to that of a standard flow. In the step 1, when the UE is about to use the PS service, for example, to browse a website, the UE has to send an activate PDP context request message, and the request message is transmitted to the SGSN of the mobile core network through the FAP. In the step 2, the SGSN may transmit a create PDP context request message to the GGSN to create the PDP context. Then, in the step 3, the GGSN may transmit back a create PDP context response message.

Thereafter, in the step 4, a radio access bearer setup procedure may be performed between to the UE, the FAP and the SGSN to reserve a network resource required by the current session. Then, in the step 5, if the reserved network resource is not in accord with the QoS established in the step 2, the SGSN may transmit an update PDP context request message to the GGSN to update the PDP context. Thereafter, in the step 6, the GGSN may transmit back an update PDP context response message.

In step 7, the SGSN may transmit back an activate PDP context accept message to the FAP, and in step 8, the FAP may map the configured IP address of the PDP context to the IP address (which is referred to as a FAP address) to be assigned to the UE. The FAP address may be the IP address managed by the FAP or may be the IP address of the FAP itself, which may be stored in a FAP record. In step 9, the activate PDP context accept message received in the step 7 is transmitted to the UE. Now, the UE completes the procedure of activating the PDP context and starts to use the PS service.

When the UE starts to transmit a packet (step 10), the packet is transmitted to the FAP, and a source address thereof is the PDP address. In step 11, the FAP may modify the IP address of the packet (i.e. the PDP address) to the FAP address according to a mapping relationship of the step 8, i.e. may modify the source address of the IP header to the FAP address. Then, in step 12, the packet is routed to the Internet. Now, the server of the Internet may set a destination address of the packet to be transmitted back according to the source address. Therefore, in step 13, the packet is routed to the FAP. When the FAP receives the packet, in step 14, the FAP may modify its destination address to the PDP address, which may be performed according to the mapping relationship of the step 8. Then, in step 15, the packet is transmitted back to the UE.

In this method, protocols and operation flows of the current nodes (the UE, the SGSN and the GGSN) are not changed.

Figure 8:
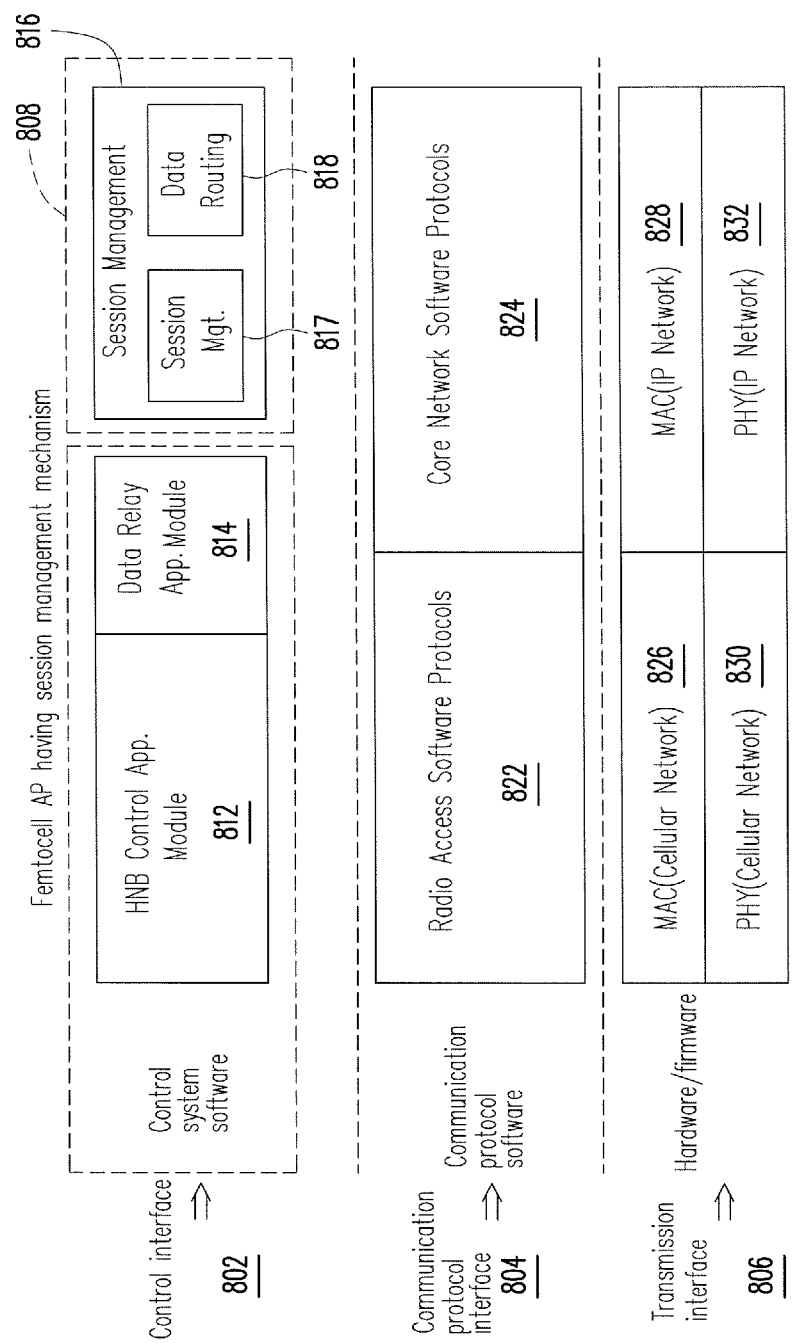
FIG. 8 is a schematic diagram illustrating an implementation structure of a Femto AP having a session management mechanism.

According to the session management mechanism designed in allusion to the FAP, a burden of the mobile core network may be reduced, and a part of the routing path of the packet switched service may be removed from the mobile core network. Moreover, according to such mechanism, besides the burden of the mobile core network may be reduced, the delay time of transmitting the packet may be also reduced. FIG. 8 is a schematic diagram illustrating an exemplary implementation structure of a FAP having the session management mechanism. The FAP may include a control interface 802, a communication protocol interface 804 and a transmission interface 806. The control interface 802 may include a control system software part, the communication protocol interface 804 may include a communication protocol software part, and the transmission interface 806 may be in the hardware or firmware of the FAP.

The control system software part includes a home node B (HNB) control application software module 812 and a data relay application software module 814 which may be consistent with the FAP standard. To achieve a purpose of the session management, the exemplary embodiment provides a session management application software module 816 including a session management unit 817 and a data routing management unit 818. The session management application software module 816 may be configured to any storage medium 808 in the Femto AP, for example, a non-volatile memory or a flash memory, etc., or may serve as a part of the firmware of the FAP.

The communication protocol software part may include a radio access protocols software module 822 and a core network protocols software module 824 consistent with the FAP standard. The hardware/firmware part may include a media access control (MAC) layer and a physical (PHY) layer, which respectively include transmission channels of a cellular network and an IP network, for example, a MAC (cellular network) 826 and a MAC (IP network) 828, and a PHY (cellular network) 830 and a PHY (IP network) 832.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A wireless communication system, comprising:
 a mobile core network, for providing a plurality of services;
 a broadband IP network, connected to the mobile core network and a packet switched service supply end;
 a Femto access point (FAP), connected to the broadband IP network, wherein the FAP has a session management function; and
 a user equipment (UE), connected to the FAP through a wireless approach, so as to connect the broadband IP network through the FAP, and establish a connection channel with the mobile core network to obtain at least one of the services,
 wherein when the UE performs a packet switched service request, an activate packet data protocol (PDP) context request message is sent to the FAP by the UE, the FAP evaluates the PDP context request message and determines whether a packet switched service accessed by the UE can be transmitted without routing through the mobile core network, if yes, the FAP generates and directly replies an activate PDP context accept message to the UE, wherein the activate PDP context accept message comprises a setting address provided by the FAP, and the UE sends a packet switching data to the FAP according to the setting address in order to obtain the packet switched service, and the FAP directly conduct the packet switched service with the packet switched service supply end through the broadband IP network.

2. The wireless communication system as claimed in claim 1, wherein after the FAP evaluates the activate PDP context request message and before the FAP replies the activate PDP context accept message to the UE, a radio access bearer setup procedure is performed to confirm whether a session state satisfies a session quality of service (QoS) demand.

3. The wireless communication system as claimed in claim 1, wherein the setting address provided by the FAP is one of a plurality of configuration addresses that is selected as the setting address and assigned to the UE.

4. The wireless communication system as claimed in claim 1, wherein the setting address provided by the FAP is a private Internet protocol (IP) address that is generated by the FAP and assigned to the UE.

5. The wireless communication system as claimed in claim 1, wherein the UE and the FAP are connected through a standard mobile communication access protocol.

6. A routing method for a packet switched service, suitable for a wireless communication system including a mobile core network, a broadband IP network, a Femto AP (FAP) and a user equipment (UE), wherein the broadband IP network is connected to the mobile core network and a packet switched service supply end, and the UE is connected to the mobile core network through the FAP and the broadband IP network, the routing method for the packet switched service comprising:
 sending an activate packet data protocol (PDP) context request message to the FAP by the UE when the UE performs a packet switched service request;
 evaluating the PDP context request message and determining whether the packet switched service accessed by the UE can be transmitted without routing through the mobile core network by the FAP, and if yes, generating and directly replying an activate PDP context accept message to the UE by the FAP, wherein the activate PDP context accept message comprises a setting address provided by the FAP;
 sending a packet switching data to the FAP by the UE according to the setting address in order to obtain the packet switched service; and
 conducting the packet switched service with the packet switched service supply end by the FAP through the broadband IP network.

7. The routing method for the packet switched service as claimed in claim 6, wherein after the FAP evaluates the activate PDP context request message and before the FAP replies the activate PDP context accept message to the UE, a radio access bearer setup procedure is performed to confirm whether a session state satisfies a session quality of service (QoS) demand.

8. The routing method for the packet switched service as claimed in claim 6, wherein the setting address provided by the FAP is one of a plurality of configuration addresses that is appointed as the setting address and assigned to the UE.

9. The routing method for the packet switched service as claimed in claim 6, wherein the setting address provided by the FAP is a private Internet protocol (IP) address or a static address required by the UE that is generated by the FAP and assigned to the UE.

10. The routing method for the packet switched service as claimed in claim 6, wherein the UE and the FAP are connected through a standard mobile communication access protocol.

11. A Femto AP (FAP), suitable for a wireless communication system including a mobile core network, a broadband IP network, and a user equipment (UE), wherein the broadband IP network is connected to the mobile core network and a packet switched service supply end, and the UE is connected to the mobile core network through the FAP and the broadband IP network, the FAP comprises a storage medium storing a session management application software module, wherein the session management application software module is used for executing a routing method for a packet switched service, which comprising:
 receiving an activate packet data protocol (PDP) context request message from the UE when the UE performs a packet switched service request;
 evaluating the PDP context request message and determining whether the packet switched service accessed by the UE can be transmitted without routing through the mobile core network by the FAP, and if yes, generating and directly replying an activate PDP context accept message to the UE, wherein the activate PDP context accept message comprises a setting address; and
 conducting the packet switched service with the packet switched service supply end through the broadband IP network when a packet switching data that is sent by the UE according to the setting address in order to obtain the packet switched service is received.

12. The FAP as claimed in claim 11, wherein after the activate PDP context request message is evaluated and before the activate PDP context accept message is replied to the UE, a radio access bearer setup procedure is performed to confirm whether a session state satisfies a session quality of service (QoS) demand.

13. The FAP as claimed in claim 11, wherein the provided setting address is one of a plurality of IP addresses assigned by the broadband IP network that is appointed as the setting address and assigned to the UE.

14. The FAP as claimed in claim 11, wherein the setting address is a private IP address or a static address required by the UE that is generated and assigned to the UE.

15. The FAP as claimed in claim 11, wherein a method for generating the activate PDP context accept message comprises:
- transmitting the activate PDP context request message to a serving general packet radio service (GPRS) support node (SGSN);
- generating and transmitting back a PDP context by a gateway GPRS support node (GGSN) according to a request of the SGSN; and
- transmitting back the activate PDP context accept message by the SGSN according to the PDP context.

16. The FAP as claimed in claim 15, further comprising executing a radio access bearer setup procedure to establish a session QoS between the UE and the mobile core network.

17. The FAP as claimed in claim 11, wherein the activate PDP context request message is a PDP context request message in a universal mobile telecommunication system (UMTS), and the activate PDP context accept message is a PDP context accept message in the UMTS.

18. The FAP as claimed in claim 11, wherein the PDP context is an EPS bearer under a system architecture evolution (SAE) mode.

19. A non-transitory storage medium, for storing a session management application software module, and applied in a Femto AP for executing a routing method for a packet switched service, the Femto AP being suitable for a wireless communication system including a mobile core network, a broadband IP network, and a user equipment (UE), wherein the broadband IP network is connected to the mobile core network and a packet switched service supply end, and the UE is connected to the mobile core network through the FAP and the broadband IP network, the routing method for the packet switched service that is executed by the session management application software module comprising:
- receiving an activate packet data protocol (PDP) context request message from the UE when the UE performs a packet switched service request;
- evaluating the PDP context request message and determining whether the packet switched service accessed by the UE can be transmitted without routing through the mobile core network by the FAP, and if yes, generating and directly replying an activate PDP context accept message to the UE, wherein the activate PDP context accept message comprises a setting address; and
- conducting the packet switched service with the packet switched service supply end through the broadband IP network when a packet switching data that is sent by the UE according to the setting address in order to obtain the packet switched service is received.

* * * * *